(12) United States Patent
Kuo et al.

(10) Patent No.: US 7,693,143 B2
(45) Date of Patent: Apr. 6, 2010

(54) FORWARDING AND ROUTING METHOD FOR WIRELESS TRANSPORT SERVICE

(75) Inventors: Ted Tsei Kuo, Palo Alto, CA (US); Ming-Jye Sheu, San Jose, CA (US); Tyan-Shu Jou, Cary, NC (US)

(73) Assignee: Accton Technology Corporation, Hsinchu (TW)

( * ) Notice: Subject to any disclaimer, the term of this patent is extended or adjusted under 35 U.S.C. 154(b) by 1636 days.

(21) Appl. No.: 10/917,656

(22) Filed: Aug. 13, 2004

(65) Prior Publication Data
US 2005/0041662 A1 Feb. 24, 2005

Related U.S. Application Data

(60) Provisional application No. 60/495,147, filed on Aug. 15, 2003.

(51) Int. Cl.
*H04L 12/28* (2006.01)
*H04J 3/24* (2006.01)

(52) U.S. Cl. .......................... 370/389; 370/349
(58) Field of Classification Search ................. 370/351, 370/389, 321, 338, 345, 349; 709/727, 724
See application file for complete search history.

(56) References Cited

U.S. PATENT DOCUMENTS

| | | | |
|---|---|---|---|
| 5,491,690 A * | 2/1996 | Alfonsi et al. ............... | 370/404 |
| 5,987,011 A | 11/1999 | Toh | |
| 6,130,881 A | 10/2000 | Stiller et al. | |
| 6,304,556 B1 | 10/2001 | Haas | |
| 6,549,786 B2 * | 4/2003 | Cheung et al. ............... | 455/524 |
| 6,731,618 B1 * | 5/2004 | Chung et al. ................. | 370/328 |
| 2002/0188871 A1 * | 12/2002 | Noehring et al. ............ | 713/201 |
| 2002/0191573 A1 * | 12/2002 | Whitehill et al. ............ | 370/338 |
| 2004/0003094 A1 * | 1/2004 | See ........................... | 709/227 |
| 2005/0180356 A1 * | 8/2005 | Gillies et al. ................ | 370/329 |

OTHER PUBLICATIONS

IETF Manet Working Group, "Mobile Ad-hoc Networks (manet)," http://www.ietf.org/html.charters/manet-charter.html.
IETF Manet Working Group, "Mobile Ad-hoc Networks (manet)," http://www.ietf.org/html.charters/manet-charter.html, Aug. 21, 2008.

\* cited by examiner

*Primary Examiner*—George Eng
*Assistant Examiner*—Christopher M Brandt
(74) *Attorney, Agent, or Firm*—Thomas, Kayden, Horstemeyer & Risley

(57) ABSTRACT

The routing method for wireless transport service comprises a step of receiving a unicast frame from an associated client; determining whether a destination of the unicast frame is locally associated. A wireless node delivers the unicast frame to a final destination if positive, otherwise, determining whether an associated transport device of a destination can be determined. The WITnet header is added and the associated transport device of the destination is put in an auxiliary address field if positive, otherwise, the next step is performed to add the WITnet header and put an address of a default edge device in the auxiliary address field. The next step is setting a tunnel frame flag, and then delivering the unicast frame to a next-hop toward the auxiliary address.

9 Claims, 4 Drawing Sheets

```
      0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |Ver|Type |         |     Flags     | Pri | GRP ID |     TTL     |
 +-+-+-+-+-+-+-+-+-+-+-+-+-+-+-+-+-+-+-+-+-+-+-+-+-+-+-+-+-+-+-+-+
 | Key Index     | Fragment ID       |     Auxiliary Address     |
 +-+-+-+-+-+-+-+-+-+-+-+-+-+-+-+-+-+-+-+-+-+-+-+-+-+-+-+-+-+-+-+-+
 |                       Auxiliary Address                       |
 +-+-+-+-+-+-+-+-+-+-+-+-+-+-+-+-+-+-+-+-+-+-+-+-+-+-+-+-+-+-+-+-+
 |          Reserved             |      Preserved Ethertype      |
 +-+-+-+-+-+-+-+-+-+-+-+-+-+-+-+-+-+-+-+-+-+-+-+-+-+-+-+-+-+-+-+-+
```

FORWARDING AND ROUTING METHOD FOR WIRELESS TRANSPORT SERVICE

CROSS-REFERENCE TO RELATED APPLICATIONS

The application claims the benefit of U.S. provisional application Ser. No. 60/495,147, filed on Aug. 15, 2003, which provisional application is hereby incorporated for reference.

The present invention is also related to co-pending application Ser. No. 10/915,627, filed on Aug. 10, 2004, and entitled "Methods and Apparatus for Broadcast Traffic Reduction on a Wireless Transport Network". The co-pending application is incorporated herein by reference.

FIELD OF THE INVENTION

The present invention relates to wireless communications systems, more particular, to a method of routing and forwarding techniques for a wireless network system on a multi-hop wireless communication.

BACKGROUND OF THE INVENTION

Typical wireless network systems comprise one or more access devices for communication purposes. The users may be communicated with the access device with personal computers or notebook computers via wireless means. Wireless local area networks (WLANs) were originally intended to allow wireless connections to a wired local area network (LAN), such as where premises wiring systems were nonexistent or inadequate to support conventional wired LANS. WLANs are often used to service mobile computing devices, such as laptop computers and personal digital assistants (PDAs). Typically, Access Points (APs) are set to ensure adequate radio coverage throughout the service area of the WLAN, while minimizing the costs associated with the installation of each AP. The APs must be configured to eliminate coverage gaps and to provide adequate coverage.

A wireless transport network is a network comprises a plurality of wirelessly connected devices that are responsible for relaying traffic for associated mobile clients. An example of a wireless transport network is a plurality of IEEE 802.11 capable devices that provide transport service for IEEE 802.11 or Bluetooth capable clients such as laptop computers, PDA (personal digital assistant), and the like. The network can further comprise one or more connections to a wired network through one or multiple edge devices. The edge devices are equipped and capable of both wireless and wired communication. In a wireless transport network, efficient reduction of unnecessary broadcast traffic is critical. The wireless transmission medium (the air) by nature is shared, therefore broadcast is a convenient way of communication in wireless networks for there is no need to transmit multiple times for a multi-destined frame. Once an originator broadcasts a frame to all its neighboring devices, some, if not all, of its neighboring devices will have to relay the frame for other remote devices. For any device that is a neighbor of multiple devices that are responsible for relaying broadcast frames, it receives multiple copies of the same frame. One simple example is once a device sends out a broadcast frame, it immediately receives multiple copies of the identical frame if there are multiple neighboring devices perform relay function for the frame. Unless a filtering method is implemented on the devices, in the worst case one single broadcast frame may be duplicated in an exponential growth fashion and saturate the network and waste device processing time. In the worst case, these frames may loop around the network until the end of their lives.

As opposed to wired networks, a wireless network has a stronger limitation on available bandwidth therefore the control overhead for route determination has to be low. Wireless network is relatively error-prone therefore the routing method has to be able to work with frame loss from time to time, and to provide resiliency. On the other hand, a wireless network provides shared medium by nature therefore broadcast to neighboring nodes can be achieved easily. Many academic and industrial organizations have been working on various forwarding mechanisms on mobile ad-hoc networks. The topologies in general represent networks that the hosts try to access the network are also responsible for relaying the traffic for the network. An ad-hoc network architecture is a network that can be deployed rapidly without relying on preexisting fixed network infrastructure. The nodes in an ad-hoc network can dynamically join and leave the network as well as being highly mobile. The communication protocols for mobile ad-hoc network emphasizes mobility for all nodes while in a wireless transport network, although the transport topology may still be dynamic, the mobility and roaming capability are for the mobile clients. The prior art includes the following:

U.S. Pat. No. 6,130,881, Stiller, et al., entitled "Traffic routing in small wireless data networks," Oct. 10, 2000.

U.S. Pat. No. 5,987,011, C. K. Toh, entitled "Routing method for ad-hoc mobile networks," Nov. 16, 1999.

U.S. Pat. No. 6,304,556, Z. J. Haas, entitled "Routing and mobility management protocols for ad-hoc networks," Oct. 16, 2001.

U.S. Pat. No. 6,549,786, R. Y. M. Cheung, entitled "Method and apparatus for connecting a wireless LAN to a wired LAN," Apr. 15, 2003.

Published documents by IETF MANET working group, please refer to http://www.ietf.org/html.charters/manet-charter.html.

U.S. Pat. No. 6,130,881 claims a method to identify wireless routing devices with N-bit addresses in an N-node wireless network. The main objective of the invention is to minimize forwarding processing overhead in a wireless network with small number of nodes. U.S. Pat. No. 5,987,011 discloses a routing technique for ad-hoc mobile networks that all devices can participate routing. The route paths are constructed under on-demand basis and the path selection is based on the stability of neighboring hosts. Stability of a neighboring node is measured by the number of contiguous "beacons" a host receives from its neighbor. This technique can be used to answer the high mobility requirement for a mobile ad-hoc network. U.S. Pat. No. 6,549,786 teaches the mechanism to set up a plurality of wireless nodes and a plurality of wired-wireless edge access points to form a local area network. The internetworking edge access points are used to relay traffic for wireless nodes unless the source and destination pair can communicate with each other directly. The wireless nodes actively select which access point it should be associated with, and determines whether it needs an AP's help to send messages. This is a one-tier solution and covers only basic connectivity issues. U.S. Pat. No. 6,304,556 discloses two communication protocols for ad-hoc networks. One for routing and the other is for mobility management. The routing protocol is a proactive-reactive hybrid routing protocol that each node is required to proactively learn the full topology of the network within its predefined routing zone, which is represented by a maximum number of hops as the distance. The mobility management protocol relies on some network nodes assuming the management function. Each mobility management node knows the location of all nodes within its zone, and communicates this information to any other mobility management node that requests it. Each node in the network has to associate with one or more management nodes. For a node needs a route to a remote destination, the node reactively queries the selected management node first, and then the management node obtains the information of the destination by communicating with other management nodes, and reply to the query. This technique is a source routing mechanism and it requires all participating nodes to execute the same protocol in the network. Members in IETF MANET working group are working on defining a few experimental routing protocols for mobile ad-hoc networks. The purpose of this working group is to standardize IP routing protocol functionality suitable for wireless routing application within both static and dynamic topologies. Two of its four experimental protocols comprise the concept of "relay nodes" selection. However, the protocols always utilize bi-directional access capability and never consider "link quality" as a routing metric.

The prior art does not teach a method of routing and forwarding techniques for a wireless transport network system based on Layer 2 (link layer) addresses on a multi-hop wireless communication.

SUMMARY OF THE INVENTION

The present invention provides a method of routing and forwarding techniques for a wireless transport network system based on Layer 2 (link layer) addresses on a multi-hop wireless communication. The present invention provides a service method when a transport node receives a unicast frame from its associated client.

The routing method for wireless transport service of one embodiment comprises:
  receiving a unicast frame from an associated client;
  determining whether a destination of the unicast frame is locally associated;
  delivering the unicast frame to a final destination if positive, otherwise, determining whether an associated transport device of a destination can be determined;
  adding a WITnet header and putting the associated transport device of the destination in an auxiliary address field if positive, otherwise, adding the WITnet header and putting an address of a default edge device in the auxiliary address field; and
  setting a tunnel frame flag, and then delivering the unicast frame to a next-hop.

The present invention provides a service method when a transport node receives a unicast frame from its neighboring node.

The routing method for wireless transport service of one embodiment comprises:
  receiving a unicast frame from a neighboring transport device;
  determining whether a tunnel frame flag is set;
  determine whether a destination is locally associated if the tunnel frame flag is unset;
  removing a WITnet header from the unicast frame and delivering the unicast frame to a final destination while the destination is locally associated, otherwise, unsetting the tunnel frame flag, looking up a destination in a forwarding table, and then delivering the unicast frame to the next-hop toward the destination.

The method of one embodiment furthering comprises the steps of: determining whether a local address is the same with an auxiliary address in the WITnet header;
  returning the step of determine whether a destination is locally associated while the local address is the same with an auxiliary address;
  determining whether the associated transport device of the destination can be determined while the local address is not the same with an auxiliary address;
  putting the associated transport device of the destination in the auxiliary address field, and then setting a tunnel frame flag when the associated transport device of the destination can be determined;
  putting an address of a default edge device in the auxiliary address field and setting the tunnel frame flag when the associated transport device of the destination can not be determined; and
  setting a tunnel frame flag, and delivering the unicast frame to a next-hop toward the auxiliary address.

Wherein an associated client includes an originator device, a relaying neighboring device or a wireless transport device. Associated transport device includes a wireless transport device.

The present invention also provides an architecture of the WITnet header includes:
  a group of bits providing version information including version number;
  a group of bits providing type information;
  a group of bits providing Flags information;
  a group of bits providing Pri (Priority of the frame) information;
  a group of bits providing GRP ID (Group ID) information;
  a group of bits providing TTL (Time to live value) information;
  a group of bits providing Key Index information;
  a group of bits providing Fragment ID information;
  a group of bits providing Reserved information; and
  a group of bits providing Preserved Ethertype information.

Wherein the group of bits providing type information includes:
  100b control frames for routing messages, neighbor discovery, ping/trace route frames;
  010b management frame for client membership announcement; and
  000b data frame for from/to clients including client data, configuration, and network management.

The group of bits providing Flags information includes:
Bit 8: membership announcement;
Bit 9: tunnel frame;
Bit 10: backbone node alert;
Bit 11: no forward bit;
Bit 12: fragment flag;
Bit 13: more fragment flag; and
Bit 14-Bit 15: Reserved.

The group of bits providing priority of the frame information includes frame from 0 (lowest) to 7 (highest).

The group of bits providing key Index information including Group key index, wherein the Group key index is 0 if pair wise key is used between transport devices, if all 0's, the frame is not encrypted.

The group of bits providing Auxiliary Address information includes:
Flag Bit 8 set: Address of originator;

Flag Bit 9 set: Address of tunneled destination transport device; and

Flag Bit 8 and Bit 9 are UNSET and it is broadcast frame: Address of device that sends the broadcast frame two hops before.

The group of bits providing Reserved information includes 2-byte field used to make the header 4-byte aligned.

The group of bits providing Preserved Ethertype information carries an original Ethertype value of the frame.

DETAILED DESCRIPTION OF THE PREFERRED EMBODIMENT

The present invention provides novel techniques for efficient forwarding and routing on a wireless transport network. The present invention presents a two-tier forwarding architecture for the wireless network that separates the functions of access and transport. The rationale of the separation is the main requirements of the two entities are different. The access network provides access control and client association management while the transport network provides a stable and resilient wireless backbone network. Preferably all devices on the infrastructure support both functions but exception may exist that certain devices can only relay traffic as part of the transport backbone but cannot provide access function to mobile clients directly. The link layers and physical layers of the two entities can be either shared or separated. To access the network, a mobile client associates with a transport device that provides access function. The associated transport device has to announce this membership to all other transport devices so the new client is reachable from others. To calculate a routing path after receiving a data frame from a mobile client, the associated transport device will first lookup which transport device the final destination is associated with, and then find the best route to the associated transport device.

Figure 1:
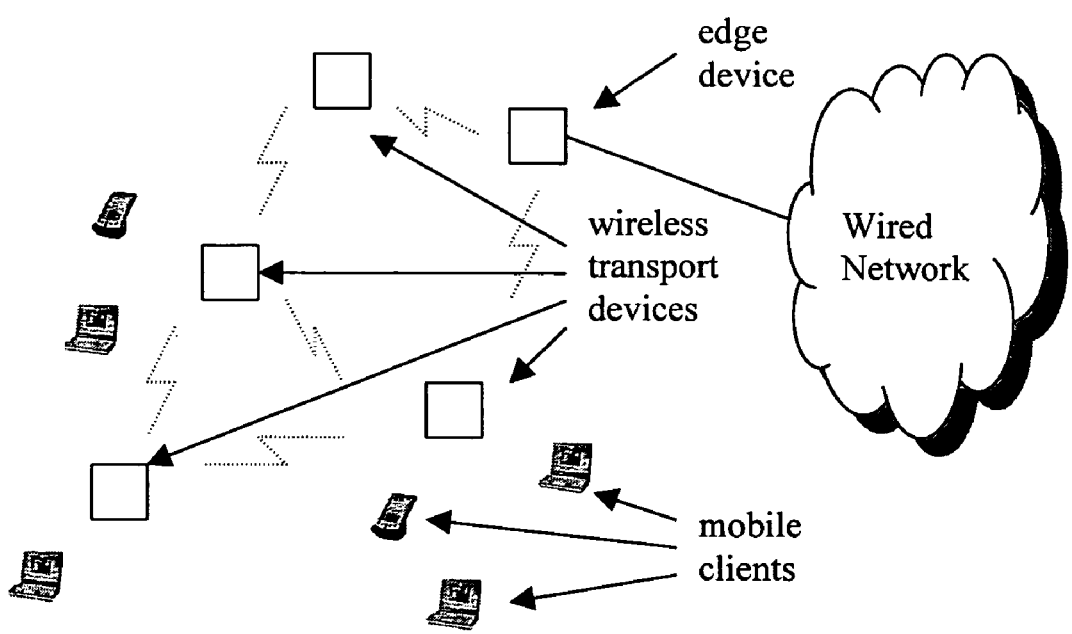
FIG. 1 illustrates an example of a wireless transport network.

FIG. 1 illustrates a communication network including at least one edge device. The wired LAN's could be joined by the edge devices, bridges and access points or base stations (not shown). The present invention further includes a plurality of wireless transport devices coupled to the edge devices by wireless networking. The wireless transport devices are capable of relaying the broadcast frame on the wireless network. The edge devices are also equipped and capable of both wireless and wired communication. This arrangement can not be found in the prior art. Each edge device communicates with a wireless transport device, and the wireless transport devices communicate to the other neighbor device, such as one or more mobile terminals (clients) or other neighboring wireless transport devices. The present invention provides more efficient methods to filter unnecessary broadcast traffic and the techniques are more suitable to be implemented in firmware or hardware to enhance forwarding throughput. Please refer to FIG. 1, a wireless transport network includes a plurality of IEEE 802.11 capable devices that provide transport service for IEEE 802.11 or Bluetooth capable clients such as laptop computers, PDA (personal digital assistant) or the like. The network can further comprise one or more connections to a wired network through one or multiple edge devices.

As illustrated in FIG. 1, all of the wireless transport device may forward broadcast frame via wireless network to other mobile client or wireless transport device. The wireless transport network includes at least one edge device that coupled between wired LAN and wireless LAN. At least one wireless transport device is coupled to the edge device and the at least one mobile device via the wireless network.

On a common wireless local area network such as the ones based on IEEE 802.11, two nodes can communicate with each other through various bit rates depending on the signal strength and device capability. The choice of a "good" path is critical in a transport network. If two nodes are reachable through an intermediate node with high bandwidth, this path may be better than a directly connected link with low bit rate or link quality. Therefore, it is not enough to only consider "reachability" in a wireless network, but also the quality of the connections.

To come up with a subset of bi-directionally connected "1-hop neighbors" from all neighboring wireless nodes, the following terminologies are used:

N: neighboring transport devices of the local transport device

N1: 1-hop neighbor set. Every node in this set also considers the local node as its 1-hop neighbor.

N1C: 1-hop neighbor candidate set. The nodes in this set may not consider the local node as their 1-hop neighbor.

N2: 2-hop neighbor set

The following algorithm can be used to decide N1 to be the base in calculating the routing paths in forwarding traffic:

Each node periodically sends "heartbeats" for neighboring nodes to receive. The heartbeat message includes:

Node's address, its N1 and N1C, and the link quality information associate with these nodes.

Once a node receives a heartbeat from another node:

Move the sender into N. Record the receiving signal strength to associate with the node.

For each node in N:

If receiving signal strength is better than 1_HOP_NEIGHBOR threshold, move it to N1C.

For each node in N but neither in N1 nor in N1C:

If it can be reached with good connection quality through a node in N1, move the node to N2. Otherwise move the node to N1C.

For each node in N1C

If the node chooses the local node to be in its either N1 or N1C, move it to N1 of the local node.

Figure 4:
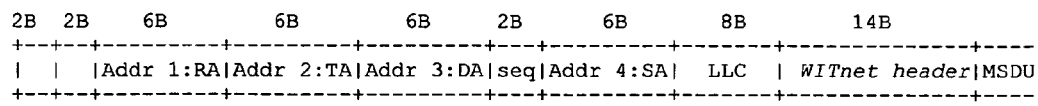
FIG. 4 shows an IEEE 802.11 MAC frame with a WITnet header inside
Figure 5:
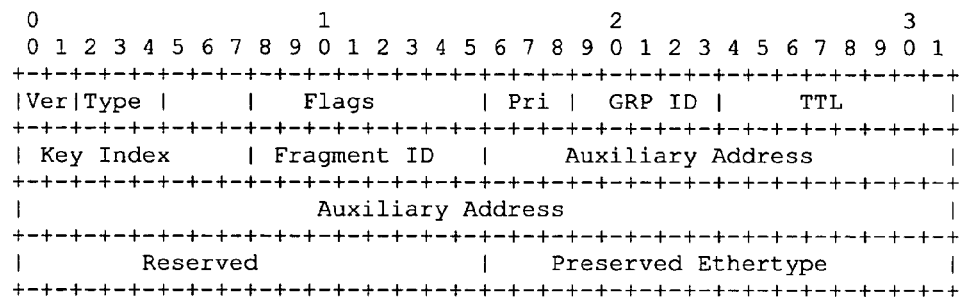
FIG. 5 shows the details of a WITnet header

All the frames running on the transport network is embedded with a WITnet header shown in FIG. 4 and FIG. 5.

Each wireless transport device according to the present invention could maintain and calculate a table that each entry contains the neighboring device from which a broadcast frame originated from a particular device can be received. For broadcast frames originated from a particular device, only the frames relayed through the listed neighboring device can be accepted. Broadcast frames coming through incorrect neighboring device are duplicates and should be ignored and dropped. Depending on the method in unicast routing path calculation, the forwarding table for unicast frames can be used as the table that is used to look up the incoming neighboring device for a broadcast frame originator.

In one example, The group of bytes for the auxiliary address using together with flag bits can carry the identify information of the transport device where the broadcast traffic is originated from. The present invention therefore provides a method of wireless communication comprising a step of carrying a name or an address of an originator wireless transport device in a broadcast frames.

When a client connects to the wireless network, it makes a choice of a group it will join. If the client is admitted into the network, all frames from and to the client are labeled with the identification of the joined group via the "GRP ID" field on the header shown in FIG. 5. Therefore members of a group communicate within their own virtual network on the transport network. If the group capability is used to represent various IP subnets, then IP subnet model can be preserved on the wireless network. A mobile client can broadcast its IP subnet and all clients in the same IP subnet will be able to receive the message. Across subnet communication is possible only at nodes that can perform IP layer routing capability.

The transport method provides the capability to build a soft "tunnel" between any two transport nodes. A node can turn on the "tunnel frame" flag and put the destined node address into the "Auxiliary Address" filed of the header for any unicast frame. The process flow when a transport node receives a unicast frame from its associated client is described in FIG. 2. The process flow when a transport node receives a unicast frame from its neighboring node is described in FIG. 3.

Figure 2:
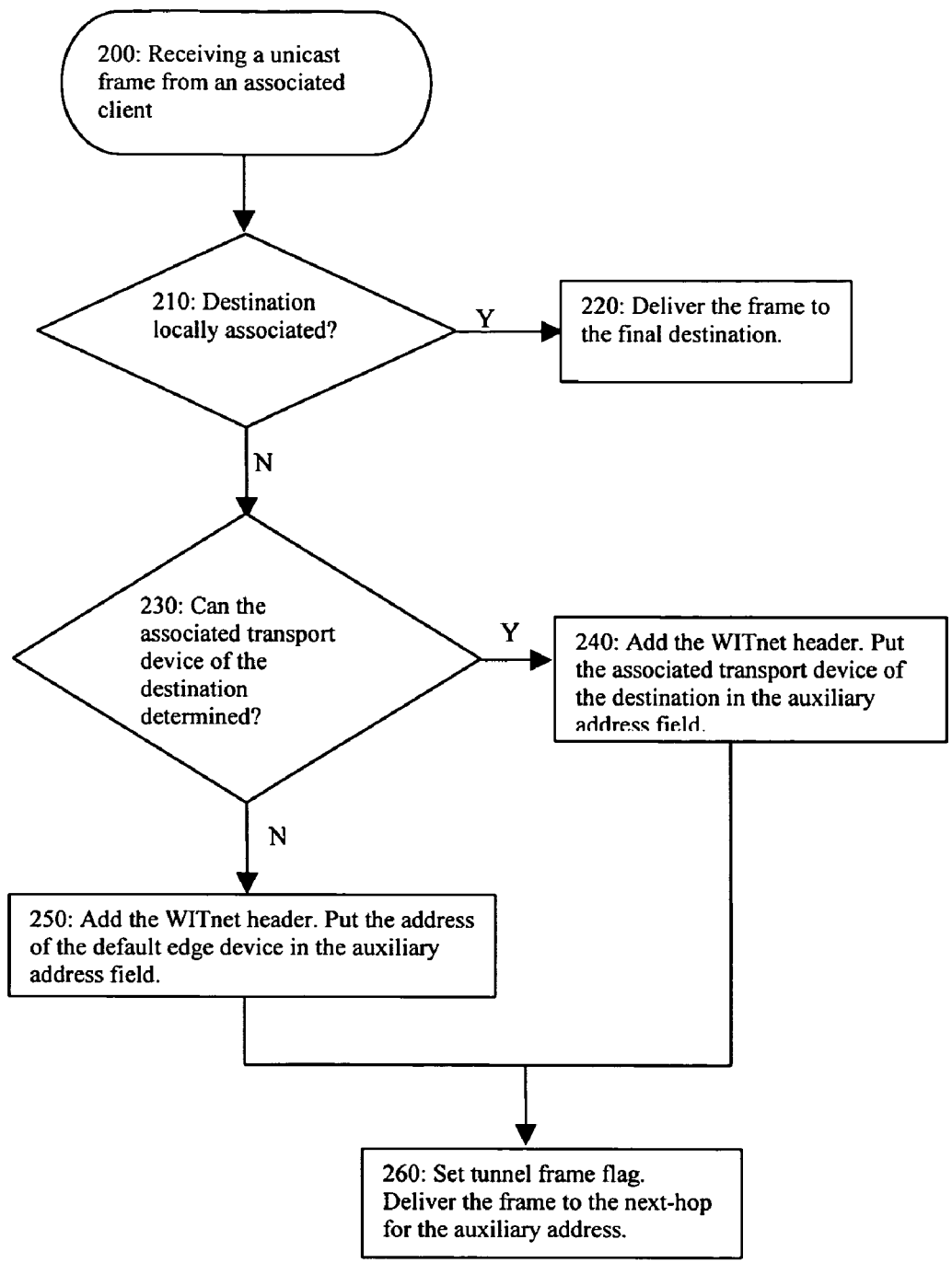
FIG. 2 illustrates a process flow when a transport node receives a unicast frame from its associated client.

Please refer to FIG. 2, in step 200, a wireless node receives a unicast frame from an associated client. In step 210: the wireless node will determine whether or not the Destination locally associated? If positive, the nest step 220 is to deliver the frame to the final destination. Otherwise, the wireless node determines whether or not could the associated transport device of the destination determined in step 230? If yes, in step 240, the node adds the WITnet header in the frame and put the associated transport device of the destination in the auxiliary address field. If not, in 250, the wireless node will add the WITnet header and put the address of the default edge device in the auxiliary address field. Finally, the wireless node (step 260) sets a tunnel frame flag, and then delivers the frame to the next-hop for the auxiliary address.

Figure 3:
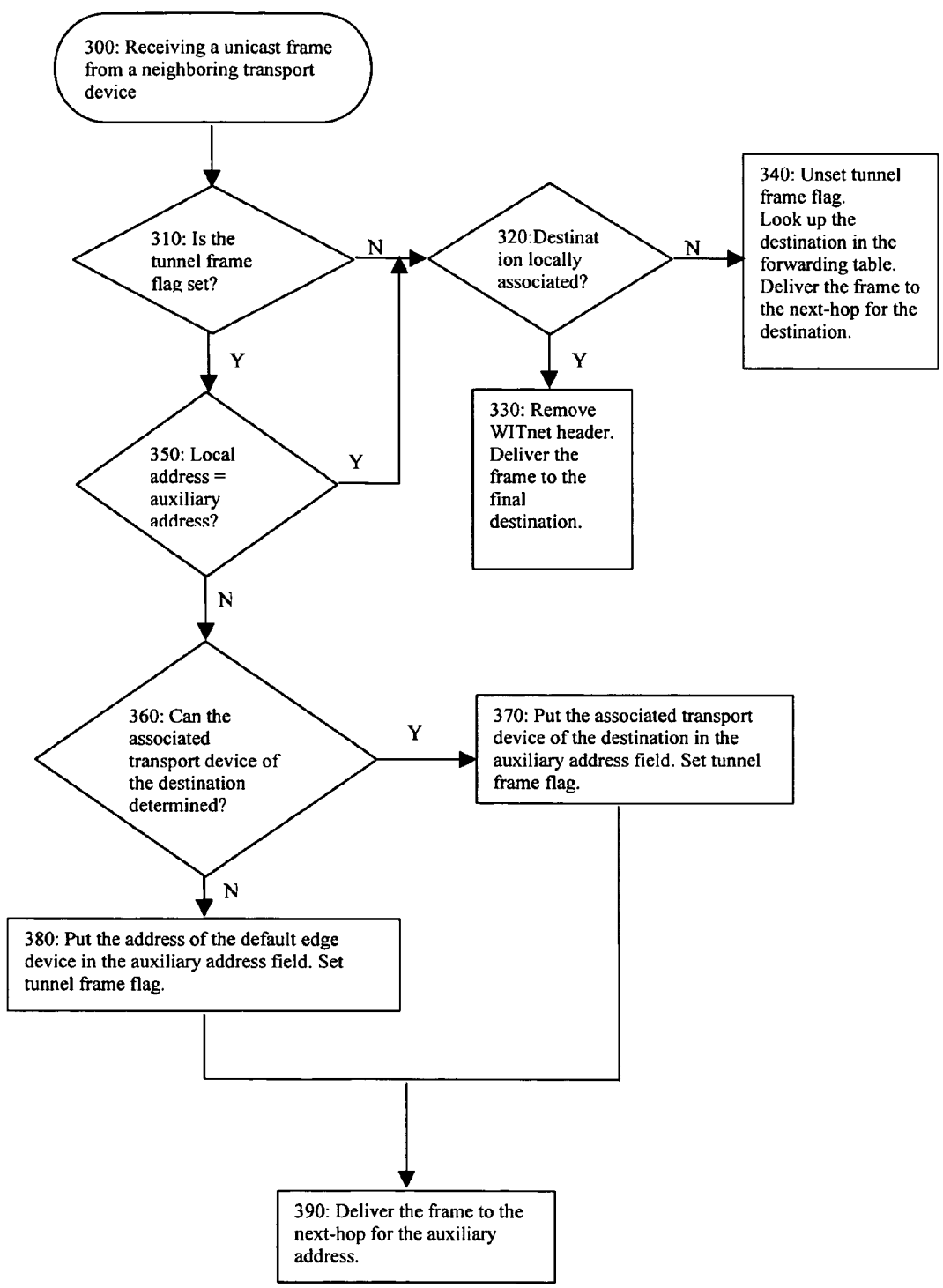
FIG. 3 shows a process flow when a transport node receives a unicast frame from its neighboring node.

Turning to FIG. 3, the process flow shows when a transport node receives a unicast frame from its neighboring node. In step 300, a wireless node receives a unicast frame from a neighboring transport device. In step 310: the wireless node will determine whether or not is the tunnel frame flag set? If negative, in step 320, the wireless node will determine whether the destination locally associated or not? If yes, the wireless node will remove the WITnet header from the broadcasting frame and deliver the broadcasting frame to the final destination in step 330. Otherwise, in step 340, the wireless node will unset tunnel frame flag, look up the destination in the forwarding table, and then deliver the frame to the next-hop for the destination.

If the determination of the step 310 is positive, the wireless node will next determines whether the local address is the same with the auxiliary address in step 350. If the determination is positive, then returns to step 320. Otherwise, in step 360, the node will determine whether or not can the associated transport device of the destination determined? If positive, the wireless node put the associated transport device of the destination in the auxiliary address field, and then set the tunnel frame flag in 370. Otherwise, in 380, the wireless node will put the address of the default edge device in the auxiliary address field and set the tunnel frame flag. Finally, the wireless node (step 390) sets a tunnel frame flag, and then delivers the frame to the next-hop for the auxiliary address.

The method allows a wireless transport device to determine to receive the broadcast frames from the originator wireless transport device by the name or address. The transport method builds a soft "tunnel" between any two wireless transport nodes. The wireless transport node can turn on the "tunnel frame" flag and put the destined node address into the "Auxiliary Address" filed of the header for any unicast frame.

In one example, the frame format is illustrated in FIGS. 4 and 5. FIG. 4 shows the format of an IEEE802.11 MAC (medium access control) frame as an example. The information communicated on the network is packaged into a frame which includes all required identifier information as well as the data to be communicated. A first group of bytes provides frame RA (Receiver Address) information, which identifies the immediate recipient of the frame. A second group of bytes specifies the TA (Transmitter Address) information, which identifies the transmitter of the frame. The next two groups of bytes provide layer of DA and SA information. DA refers to the destination address. SA refers to Source Address as known in the art. The next group of bytes in the frame provides the protocol identifiers for the frame. For example, these frames might provide Logical Link Control (LLC) information. The next group of bytes defines the WITnet header. The next group of bytes defines the MSDU (MAC Service Data Unit) of the frame, which carries the information to be served by the transport network. As mentioned above, FIG. 3 is a format of an IEEE802.11 MAC frame as an example. Inside the MAC header, an extra "WITnet header" is added to carry the needed information for the transport device to perform its responsibility.

FIG. 5 shows the details of the WITnet header. The architecture of the WITnet header is described as follows. A first group of bits provides Version information including version number. A second group of bits provides Type information. For example:

Layer 2 frame type:
    100b—control frames (routing messages, neighbor discovery, ping/trace route frames, etc.)
    010b—management frame (client membership announcement, etc)
    000b—data frame: from/to clients (client data, configuration, network management)

A third group of bits provides Flags information (Bit 8-Bit 15), for example:
    b8: Membership announcement (if this bit is set, aux addr filed contains the originator transport device address)
    b9: Tunnel frame (If this bit is set, aux addr filed contains destined transport device address.)
    b10: Backbone node alert (If the bit is set, the node sees the frame process the frame, regardless of its DA.)
    b11: No Forward bit (No propagation if the frame is a broadcast frame. This is significant on control frames only)
    b12: Fragment flag (1 means this frame is a fragment)
    b13: More fragment flag (if this bit is 0 and the fragment bit is set, this frame is the last fragment)
    b14-b15: Reserved A forth group of bits provides Pri (Priority of the frame) information (Bit 8-Bit 15), for example: Priority of the frame, from 0 (lowest) to 7 (highest).

A fifth group of bits provides GRP ID (Group ID) information.

A sixth group of bits provides TTL (Time to live value) information.

A seventh group of bits provides Key Index information. For example, Group key index. If all 0's, the frame is not encrypted. Note: encryption should utilize what hardware chipset can provide. Group key index is 0 if pair wise key is used between transport devices.

An eighth group of bits provides Fragment ID information. A value assigned to a group of fragments making up a complete set. The value is incremented with each new set of fragments.

A ninth group of bits provides Auxiliary Address information.

Flag b8 set: Address of originator

Flag b9 set: Address of tunneled destination transport device

Flag b8 and b9 are UNSET and it is broadcast frame: Address of device who sends this broadcast frame two hops before.

A tenth group of bits provides Reserved information. This 2-byte field is used to make the header 4-byte aligned.

An eleventh group of bits provides Preserved Ethertype information. This field carries the original Ethertype value since the Ethertype field inside the 802.11 header may be changed It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A wireless transport network system which contains:
   a node configured to determine a signal strength, the node further configured to add a WITnet header including:
      a group of bits providing version information including version number;
      a group of bits providing type information;
      a group of bits providing Flags information;
      a group of bits providing Pri (Priority of the frame) information;
      a group of bits providing GRP ID (Group ID) information;
      a group of bits providing TTL (Time to live value) information;
      a group of bits providing Key Index information;
      a group of bits providing Fragment ID information;
      a group of bits providing Reserved information;
      a group of bits providing Preserved Ethertype information; and
      a group of bits providing Auxiliary Address information;
      wherein the group of bits providing Auxiliary Address information contains an address of an associated transport device of a destination on a wireless network when a predetermined one of said group of bits providing Flags information is set, the associated transport device being on the wireless network and having a greater signal strength than the destination.

2. The system of claim 1, wherein said group of bits providing type information includes:
   100b control frames for routing messages, neighbor discovery, ping/trace route frames;
   010b management frame for client membership announcement; and
   000b data frame for from/to clients including client data, configuration, and network management.

3. The system of claim 1, wherein said group of bits providing Flags information includes:
   Bit 8: membership announcement;
   Bit 9: tunnel frame;
   Bit 10: backbone node alert;
   Bit 11: no forward bit;
   Bit 12: fragment flag;
   Bit 13: more fragment flag; and
   Bit 14-b15: Reserved.

4. The system of claim 1, wherein said group of bits providing priority of the frame information includes frame from 0 (lowest) to 7 (highest).

5. The system of claim 1, wherein said group of bits providing key Index information including Group key index, wherein said Group key index is 0 if pair wise key is used between transport devices, if all 0's, the frame is not encrypted.

6. The system of claim 1, wherein said group of bits providing Auxiliary Address information includes:
   Flag Bit 8 and Bit 9 are UNSET and it is broadcast frame: Address of device that sends said broadcast frame two hops before.

7. The system of claim 1, wherein said group of bits providing Reserved information includes a 2-byte field used to make the header 4-byte aligned.

8. The system of claim 1, wherein said group of bits providing Preserved Ethertype information carrying an original Ethertype value.

9. A wireless transport network system containing a frame of an IEEE802.11 MAC (medium access control) comprising:
   a node configured to determine a signal strength, the node further configured to add a WITnet header;
   a group of bytes providing frame RA (Receiver Address) information, which identifies the immediate recipient of the frame;
   a second group of bytes specifies the TA (Transmitter Address) information, which identifies the transmitter of the frame;
   groups of bytes providing layer of DA and SA information, wherein said DA refers to a destination address, said SA refers to a Source Address;
   a group of bytes providing a protocol identifiers;
   a group of bytes defining the WITnet header, the WITnet header comprising a group of bits providing Flags information and group of bits providing Auxiliary Address information, the group of bits providing Auxiliary Address information containing an address of an associated transport device of a destination on a wireless network when a predetermined one of said group of bits providing Flags information is set, the associated transport device being on the wireless network and having a greater signal strength than the destination; and
   a group of bytes defining a MSDU (MAC Service Data Unit) which carries information to be served by a transport network.

* * * * *